US012686347B2

(12) United States Patent
Ikeda

(10) Patent No.: US 12,686,347 B2
(45) Date of Patent: Jul. 21, 2026

(54) POWER-SUPPLY MANAGEMENT DEVICE FOR SERVICE MODULES AND SERVICE MODULE INSTALLED VEHICLE

(71) Applicant: YAZAKI CORPORATION, Tokyo (JP)

(72) Inventor: Kei Ikeda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 18/460,479

(22) Filed: Sep. 1, 2023

(65) Prior Publication Data

US 2023/0415684 A1 Dec. 28, 2023

Related U.S. Application Data

(63) Continuation of application No. PCT/JP2022/014845, filed on Mar. 28, 2022.

(30) Foreign Application Priority Data

Apr. 30, 2021 (JP) ................................. 2021-077234

(51) Int. Cl.
B60R 16/03 (2006.01)

(52) U.S. Cl.
CPC .................................... B60R 16/03 (2013.01)

(58) Field of Classification Search
CPC ............ B60L 50/60; B60L 1/00; B60L 58/12; B60W 20/12; B60W 2510/305; B60R 16/03
See application file for complete search history.

(56) References Cited

U.S. PATENT DOCUMENTS

2020/0207419 A1    7/2020  Iwasaki et al.
2020/0254901 A1*   8/2020  Leger ..................... B60L 58/21
2020/0256609 A1*   8/2020  Kondrk ................ F25D 19/003
(Continued)

FOREIGN PATENT DOCUMENTS

JP        2004-231046 A        8/2004
JP        2009-253993 A       10/2009
(Continued)

OTHER PUBLICATIONS

International Search Report for PCT/JP2022/014845 dated Jun. 14, 2022.

*Primary Examiner* — Scott A Browne
*Assistant Examiner* — Rami Nabih Bedewi
(74) *Attorney, Agent, or Firm* — KENEALY VAIDYA LLP

(57) ABSTRACT

A power-supply management device for service modules applied to a service module installed vehicle includes a vehicle state recognition unit that recognizes a state of a vehicle in which service modules are interchangeably installed, a service module identification unit that identifies a type of the service modules currently installed in the vehicle, and a power-supply management processing unit that is capable of executing, for each of the service modules, power-supply management processing of managing power supply to the service module individually based on the state of the vehicle recognized by the vehicle state recognition unit and the type of the service module identified by the service module identification unit.

17 Claims, 5 Drawing Sheets

(56)         References Cited

U.S. PATENT DOCUMENTS

| | | | |
|---|---|---|---|
| 2021/0070141 A1* | 3/2021 | Schumacher | B60H 1/00428 |
| 2021/0094506 A1* | 4/2021 | Baker | B60R 25/241 |
| 2021/0394660 A1* | 12/2021 | Crawford, Jr. | B60P 1/38 |
| 2022/0072931 A1* | 3/2022 | Chen | B60H 1/32 |
| 2022/0072962 A1* | 3/2022 | Maury | B60L 7/10 |
| 2022/0111699 A1* | 4/2022 | Hofsdal | B60H 1/3205 |
| 2022/0203845 A1* | 6/2022 | Nelson | B60W 10/26 |
| 2022/0219629 A1 | 7/2022 | Suenaga | |
| 2023/0191923 A1* | 6/2023 | Kazyak | B60L 53/14 |
| | | | 180/68.5 |

FOREIGN PATENT DOCUMENTS

| | | | |
|---|---|---|---|
| JP | 2011-207384 A | 10/2011 | |
| JP | 2012-191736 A | 10/2012 | |
| JP | 2020-40638 A | 3/2020 | |
| JP | 2020-203516 A | 12/2020 | |
| KR | 10-2020-0007177 A | 1/2020 | |
| WO | 2018/230720 A1 | 12/2018 | |

* cited by examiner

FIG.4

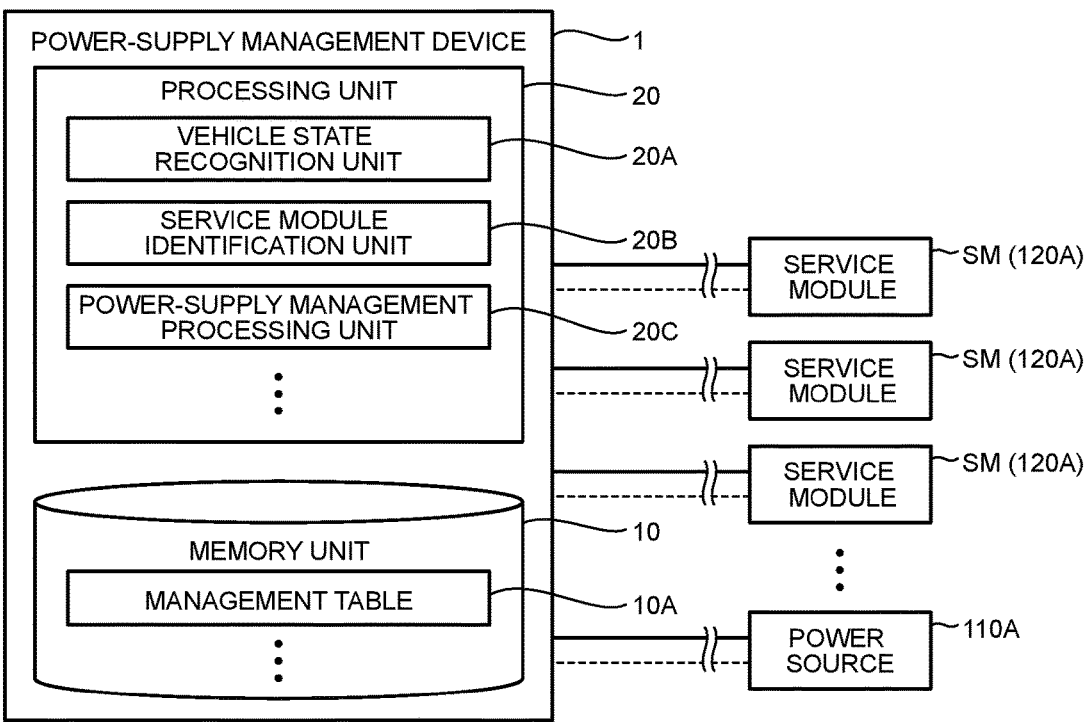

| | | DETERMINE PRIORITY | | | OPERATIONALLY REQUIRED ELECTRIC POWER AMOUNT CORRESPONDING TO STATE | | |
|---|---|---|---|---|---|---|---|
| | | IMPORTANCE LEVEL | IMPACT LEVEL ON PRODUCT VALUE DUE TO POWER SUPPLY OFF | PRIMARY PURPOSE (OP-TIONALLY SET) | PRIORITY TO POWER SUPPLY OFF | OUTBOUND TRAVEL AND MOVEMENT STATE | SERVICE PROVISION STATE | RETURN TRAVEL AND MOVEMENT STATE |
| TYPES OF SERVICE MODULE | ATM | HIGH | - | | 3 | 150 W | 300 W | 150 W |
| | CERTIFICATE AND RESIDENCE CERTIFICATE | HIGH | - | | 3 | 150 W | 300 W | 150 W |
| | TICKET | LOW | LOW | | 1 | 0 | 300 W | 0 |
| | MAILBOX | LOW | LOW | | NEED NO POWER SUPPLY | 0 | 0 | 0 |
| | PARCEL | LOW | LOW | ✓ | 1 | 0 | 150 W | 0 |
| | FOOD (REFRIGERATED AND FROZEN) | LOW | HIGH | | 2 | 1000 W | 1000 W | 1000 W |
| | FOOD (ROOM TEMPERATURE) | LOW | LOW | | 1 | 0 | 300 W | 0 |
| | DRINK | LOW | LOW | | 1 | 800 W | 1000 W | 0 |

POWER-SUPPLY MANAGEMENT DEVICE FOR SERVICE MODULES AND SERVICE MODULE INSTALLED VEHICLE

CROSS-REFERENCE TO RELATED APPLICATION

This application is a continuation application of International Application No. PCT/JP2022/014845 filed on Mar. 28, 2022 which claims the benefit of priority from Japanese Patent Application No. 2021-077234 filed on Apr. 30, 2021 and designating the U.S., the entire contents of which are incorporated herein by reference.

BACKGROUND OF THE INVENTION

1. Field of the Invention

The present invention relates to a power-supply management device for service modules and a service module installed vehicle.

2. Description of the Related Art

For example, in Japanese Patent Application Laid-open No. 2004-231046, a mobile vending vehicle in which equipment for cooking food and drink can be installed is disclosed. This mobile vending vehicle includes a first guide unit provided on a floor of a cargo area, a second guide unit provided on a side of the cargo area, and a cooking unit for cooking food and drink that is provided with a first coupling unit able to be coupled with the first guide unit and a second coupling unit able to be coupled with the second guide unit. The first guiding unit and the first coupling unit slide to be engaged with each other, and the second guiding unit and the second coupling unit slide to be engaged with each other, so that the mobile vending vehicle accommodates a cooking unit in the cargo area. In this way, in the mobile vending vehicle, cooking utensils can be easily changed according to various cooking patterns.

Meanwhile, the mobile vending vehicle described in the above-mentioned Japanese Patent Application Laid-open No. 2004-231046 may be applied to what is called Mobility as a Service (MaaS), for example, but from the perspective of what is called Sustainable Development Goals (SDGs), there is room for further improvement in terms of more appropriate power supply to service modules such as cooking units.

SUMMARY OF THE INVENTION

The present invention has been made in view of the above circumstances, and an object of the present invention is to provide a power-supply management device for service modules that is able to properly supply electric power to the service modules, and a service module installed vehicle.

In order to achieve the above mentioned object, a power-supply management device for service modules according to one aspect of the present invention includes a vehicle state recognition unit that recognizes a state of a vehicle in which a plurality of service modules are interchangeably installed; a service module identification unit that identifies a type of the service modules currently installed in the vehicle; and a power-supply management processing unit that is capable of executing, for each of the service modules, power-supply management processing of managing power supply to the service module individually based on the state of the vehicle recognized by the vehicle state recognition unit and the type of the service module identified by the service module identification unit, wherein the vehicle is capable of recombining with various combinations of the installed plurality of the service modules, the service module identification unit identifies a type of each of the plurality of the service modules installed in the vehicle individually, and in the power-supply management processing, the power-supply management processing unit executes, for each of the service modules, the power-supply management processing of managing power supply to the service module individually based on the state of the vehicle recognized by the vehicle state recognition unit and the type of the plurality of the service modules identified by the service module identification unit, and distributes and supplies electric power from a power source to each of the plurality of the service modules.

In order to achieve the above mentioned object, a service module installed vehicle according to another aspect of the present invention includes a plurality of module installation parts in which service modules are interchangeably installed; a power source that is capable of supplying electric power to the service modules; and a power-supply management device for service modules that manages power supply from the power source to the service modules, wherein the power-supply management device for service modules includes a vehicle state recognition unit that recognizes a state of own vehicle in which the plurality of the module installation parts, the power source, and the power-supply management device for service modules are installed, a service module identification unit that identifies types of the service modules currently installed in the own vehicle, and a power-supply management processing unit that is capable of executing, for each of the service modules, power-supply management processing of managing power supply to the service module individually based on the state of the own vehicle recognized by the vehicle state recognition unit and the type of the service module identified by the service module identification unit, wherein the own vehicle is capable of recombining with various combinations of the plurality of the service modules installed in the plurality of the module installation parts, the service module identification unit identifies a type of each of the plurality of the service modules installed in the plurality of the module installation parts individually, and in the power-supply management processing, the power-supply management processing unit executes, for each of the plurality of the service modules, the power-supply management processing of managing power supply to the service module individually based on the state of the own vehicle recognized by the vehicle state recognition unit and the type of the plurality of the service modules identified by the service module identification unit, and distributes and supplies electric power from the power source to each of the plurality of the service modules.

BRIEF DESCRIPTION OF THE DRAWINGS

FIG. 4 is a block diagram illustrating a schematic configuration of a power-supply management device according to the embodiment;

FIG. 5 is a schematic diagram illustrating an example of a management table applied to the power-supply management device according to the embodiment.

DETAILED DESCRIPTION OF THE PREFERRED EMBODIMENTS

Hereinbelow, a detailed description of an embodiment of the present invention will be given with reference to the drawings. The present invention is not limited to the embodiment. In addition, components in the following embodiment include components that are substitutable, and easily conceived by the skilled in the art, or components that are substantially the same as the components in the embodiment.

Embodiment

Figure 1:
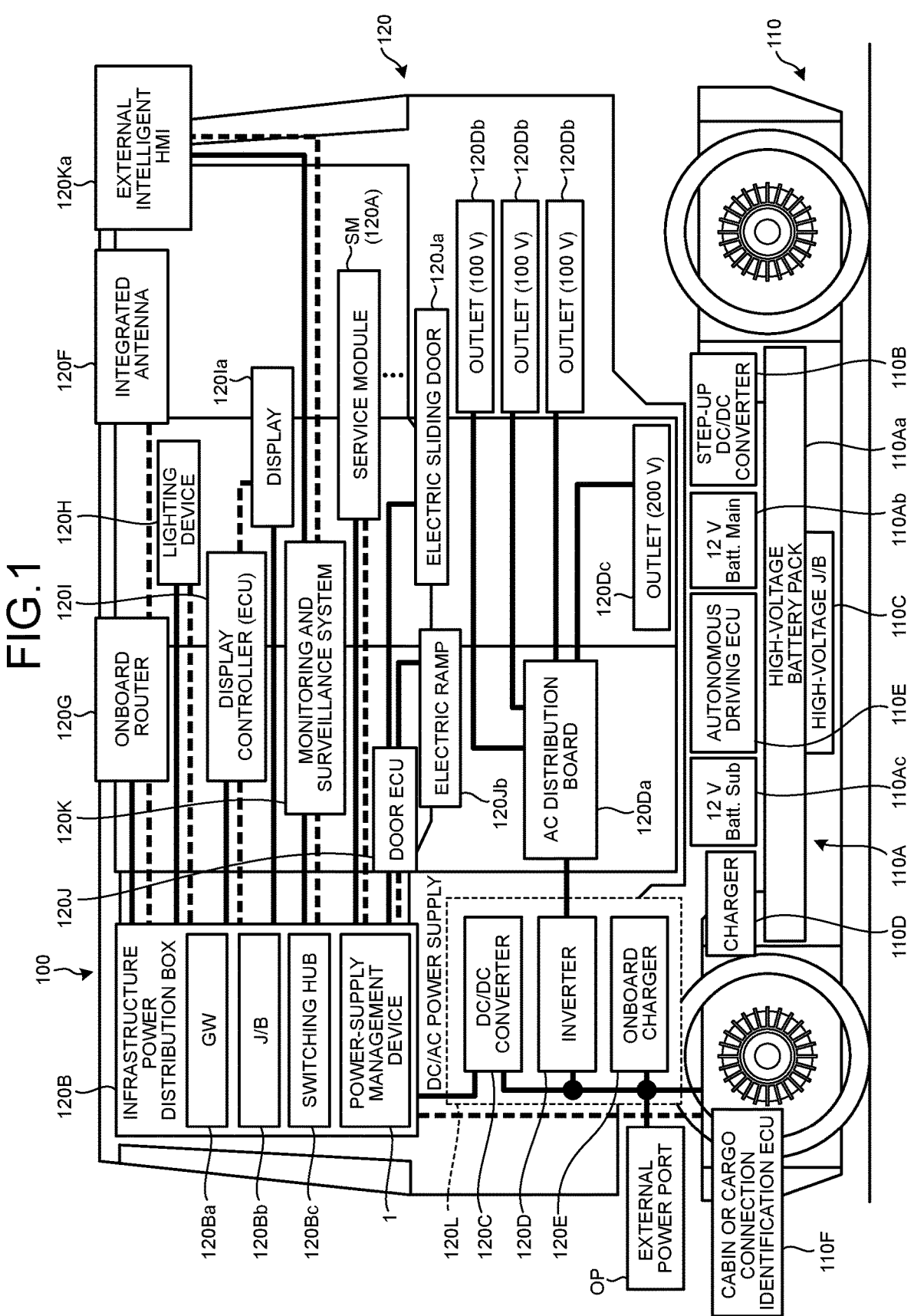
FIG. 1 is a block diagram illustrating an example of a functional arrangement of a service module installed vehicle according to an embodiment.

A power-supply management device 1 as a power-supply management device for service modules illustrated in FIG. 1 according to the present embodiment is a device that is applied to a vehicle 100 serving as a service module installed vehicle and performs power-supply management for service modules SM installed in the vehicle 100. Hereinbelow, the basic configuration of the vehicle 100 to which the power-supply management device 1 is applied is first described with reference to FIGS. 1, 2, and 3, and the power-supply management device 1 is then described in detail with reference to FIGS. 4, 5, 6, and other figures.

Figure 2:
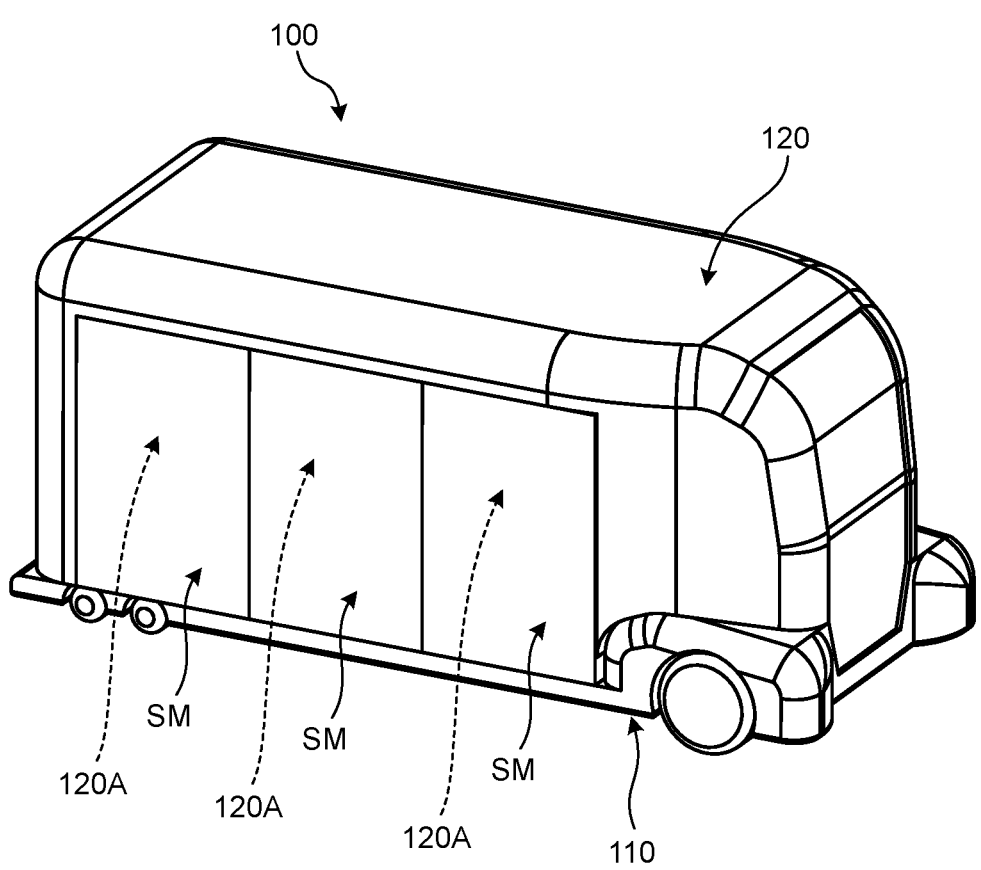
FIG. 2 is a perspective view illustrating a schematic configuration of the service module installed vehicle according to the embodiment.
Figure 3:
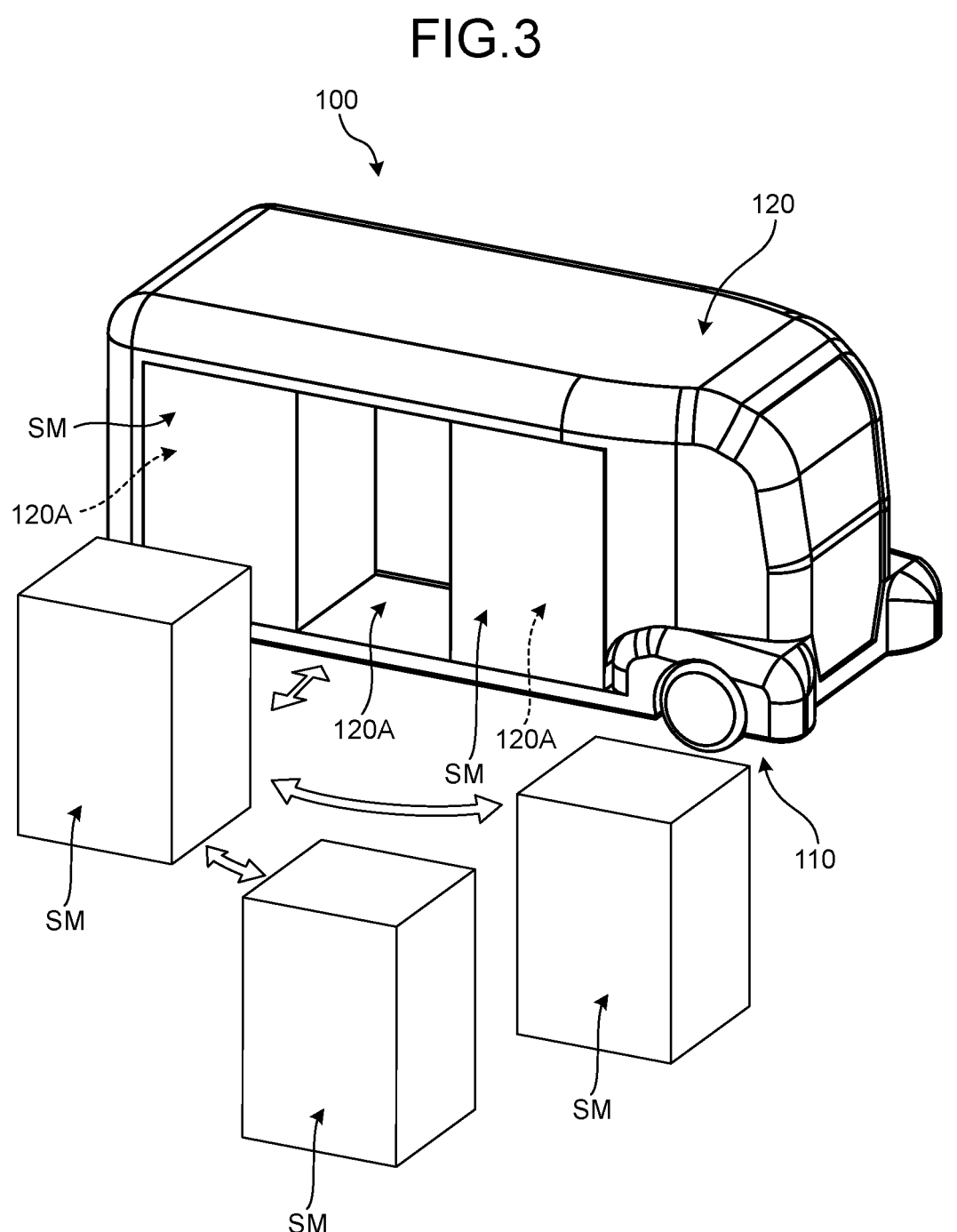
FIG. 3 is a perspective view illustrating a schematic configuration of the service module installed vehicle according to the embodiment.

The vehicle 100 illustrated in FIGS. 1, 2, and 3 can be any vehicle with a motor or an engine used as a drive source, such as an electric vehicle (EV), a hybrid electric vehicle (HEV), a plug-in hybrid electric vehicle (PHEV), a gasoline vehicle, or a diesel vehicle. The operation of the vehicle 100 may be any of manual operation, semi-autonomous operation, or fully autonomous operation operated by a driver. The vehicle 100 may also be what is called a private car owned by an individual, a rental car, a shared car, a bus, a cab, or a ride-sharing car.

In the following description, as an example, the vehicle 100 will be described as what is called a mobility as a service (MaaS)-dedicated vehicle applied to MaaS or the like. The vehicle 100 is described as a fully autonomous electric vehicle that is managed by an operator or the like who operates the vehicle 100 and autonomously travels between a vehicle base location (vehicle base facility) and a location where a service is provided.

In the vehicle 100 illustrated in FIG. 1, a connection method for transmitting and receiving power supply, control signals, and various types of information between individual components may be either wired or wireless, unless otherwise specified. A wired connection is, for example, a connection via wires, optical fibers, or other wiring materials. A wireless connection is, for example, a connection by wireless communication, wireless charging system, or the like. As an example, in FIG. 1, the simple overview of a power-supply system for supplying electric power to individual parts is illustrated by solid lines. The power-supply system of the vehicle 100 may include various electric power lines for, such as alternating current (AC) 100 V, AC 200 V, direct current (DC) low-voltage batteries (12 V/48 V), direct current (DC) high-voltage batteries, and direct current (DC) high-voltage fast charging, for example. On the other hand, in FIG. 1, the simple overview of a communication system for communication between individual parts is illustrated by dotted lines. The communication system of the vehicle 100 may include various communication lines for, such as controller area network (CAN) with flexible data rate (CAN FD), for example. The same is applied to FIG. 4 described later.

Specifically, the vehicle 100 of the present embodiment includes a chassis 110 and a cargo 120, and is provided with a power source 110A arranged on the chassis 110 side, and module installation parts 120A and the above-mentioned power-supply management device 1 arranged on the cargo 120 side.

The chassis 110 is an electric vehicle chassis (EV platform) that supports the cargo 120 from below and is equipped with various actuators allowing the vehicle 100 to travel (fully autonomous driving). The chassis 110 has, for example, a function of autonomously moving between the vehicle base location and the location where a service is provided, a function of roadside-to-vehicle communication, a function of automatic charging, and other functions. The chassis 110 is equipped with, for example, the above-mentioned power source 110A together with wheels, suspension devices, and traveling system actuators allowing the vehicle 100 to travel (driving system for traveling, steering system, braking system, and other systems).

The power source 110A is a power source (electric power source) that can supply electric power to the service modules SM. The power source 110A of the present embodiment is also used as an electric power source that can supply electric power to the individual parts of the vehicle 100 other than the service modules SM. In the vehicle 100 of the present embodiment, the power source 110A, which is capable of supplying electric power to the service modules SM, is also used for allowing the vehicle 100 to travel. Here, the power source 110A is typically formed mainly of power storage devices such as a high-voltage battery pack 110Aa, a 12 V main battery (12 V Batt. Main) 110Ab, and a 12 V sub-battery (12 V Batt. Sub) 110Ac, which can store electric power.

In addition to the power source 110A, the chassis 110 of the present embodiment is also provided with, for example, a step-up DC/DC converter 110B, a high-voltage junction box (J/B) 110C, a charger 110D, an autonomous driving electronic control unit (ECU) 110E, a cabin or cargo connection identification ECU 110F, and other components. The step-up DC/DC converter 110B is a direct current voltage converter that boosts a direct current voltage input from the power source 110A or the like and outputs the voltage. The high-voltage junction box 110C is an electrical junction box that distributes electric power supplied from the high-voltage battery pack 110Aa to individual parts. The charger 110D charges the power source 110A with electric power, which is supplied from an external power source through an external power port (AC 100/200 V) OP. The autonomous driving ECU 110E is a processing unit to which various sensors, detectors, imaging devices, and other components provided in the individual parts of the vehicle 100 are connected and which executes processing related to autonomous driving of the vehicle 100 based on information acquired from these components. The cabin or cargo connection identification ECU 110F is a processing unit that performs processing of identifying a structure connected to the top of the chassis 110. For example, depending on the purpose, the vehicle 100 may be configured so that the structure connected to the top of the chassis 110 can be changed to, for example, a cabin, mainly a passenger cabin, in addition to the cargo 120. In such a case, the cabin or cargo connection identification ECU 110F identifies the type of a structure (a cabin, a cargo, or other structures) that is currently connected to the top of the chassis 110 based on information from various sensors, detectors, imaging devices, and other components provided in the individual parts of the chassis 110.

The cargo 120 is a structure connected to the top of the chassis 110 and supported by the chassis 110. The cargo 120 has, for example, functions of loading and exchanging the service modules SM, identifying the types of the service modules SM, and supplying power and performing signal communication tailored to the service modules SM. For example, the above-mentioned module installation parts 120A (see FIGS. 2 and 3) and the above-mentioned power-supply management device 1 (see FIG. 1) are installed on the chassis 110 along with various instruments.

Each of the module installation parts 120A is a part of the cargo 120 of the vehicle 100 where the service modules SM are interchangeably installed. Various known structures with, for example, a module receiving cargo compartment, guide rails, locking mechanisms, and the like can be applied to the module installation parts 120A. The module installation parts 120A enables the installation of a wide variety of the service modules SM. Here, a plurality of the module installation parts 120A (herein, three) are provided in the cargo 120, and the service modules SM individually installed in each of the module installation parts 120A are interchangeable. That is, in the cargo 120, the service modules SM installed in the module installation parts 120A can be recombined with various combinations.

Here, each of the service modules SM installed in the module installation parts 120A is a structural module for providing various services. Each part of the service modules SM is configured according to the content of the service to be provided. As the service modules SM, a wide variety of modules, such as an automatic teller machine (ATM), a certificate and residence certificate issuing machine, a ticket issuing machine, a mailbox, a parcel delivery box, a food (refrigerated, frozen, and room temperature) vending machine, a drink vending machine, and the like can be applied. The vehicle 100 can provide, according to the purpose, different services on different days by, for example, recombining combinations of such service modules SM each of which is installed in each of the module installation parts 120A.

The power-supply management device 1 is a device that manages power supply from the power source 110A to the service modules SM. This power-supply management device 1 of the present embodiment can also manage power supply to the individual parts of the vehicle 100 other than the service modules SM. Here, an infrastructure power distribution box (BOX) 120B constitutes the power-supply management device 1, together with a gateway (GW) 120Ba, a junction box (J/B) 120Bb, and a switching hub (HUB) 120Bc. The infrastructure power distribution box 120B is connected to each part of the cargo 120, including the service modules SM, and each part of the chassis 110, including the power source 110A, via the power-supply system and the communication system, and is a unit that comprehensively manages power supply and signal communication to the individual parts. The gateway 120Ba is a communication relay device that performs protocol conversion processing of mutually converting protocols used between different networks during signal communication to the individual parts. The junction box 120Bb is an electrical junction box that distributes electric power supplied from the power source 110A to the individual parts. The switching hub 120Bc is a concentrator in the communication system, and is a communication relay device that relays signal communication to the individual parts. The configuration of the above-mentioned power-supply management device 1 will be described in detail later.

In addition to the module installation part 120A and the infrastructure power distribution box 120B (power-supply management device 1), the cargo 120 of the present embodiment also includes, for example, a DC/DC converter 120C, an inverter 120D, an onboard charger 120E, an integrated antenna 120F, an onboard router 120G, a lighting device 120H, a display controller (ECU) 120I, a door ECU 120J, a monitoring and surveillance system 120K, and other components. The DC/DC converter 120C is a direct current voltage converter that converts a direct current voltage output from the power source 110A of the chassis 110 or the like and outputs the converted voltage to the infrastructure power distribution box 120B. The inverter 120D is a reverse converter that converts direct current output from the power source 110A of the chassis 110 or the like into alternate current, and supplies the alternate current to an outlet (100 V) 120Db and an outlet (200 V) 120Dc via an AC distribution board 120Da, for example. The onboard charger 120E charges a storage device (not illustrated) of the cargo 120 with electric power from an external power source supplied through an external power port OP. The DC/DC converter 120C, the inverter 120D, and the onboard charger 120E constitute a DC/AC power supply 120L in the cargo 120. The integrated antenna 120F is an antenna that transmits and receives electromagnetic waves to and from external communication targets to perform communication. The onboard router 120G is a communication relay device that intervenes between the integrated antenna 120F and the infrastructure power distribution box 120B to perform the routing process to distribute signals. The above-mentioned switching hub 120Bc distributes signals to each network based on the routing process by this onboard router 120G. The lighting device 120H is a fixture that is provided in the cargo 120 and illuminates the cargo 120. The display controller (ECU) 120I is a processing unit that executes processing related to the display of a display 120Ia provided in the cargo 120. The door ECU 120J is a processing unit that executes processing related to the operation of an electric sliding door 120Ja and an electric ramp 120Jb provided in the cargo 120. The monitoring and surveillance system 120K is a system that monitors and surveils the cargo 120 during the provision of services based on information acquired from various sensors, detectors, and imaging devices provided in the individual parts of the cargo 120. The monitoring and surveillance system 120K can also be linked to an external intelligent HMI 120Ka to provide various types of information to the outside.

A brief overview of the basic configuration of the vehicle 100 to which the power-supply management device 1 according to the present embodiment is applied was described as above. This vehicle 100 corresponds to "own vehicle" in which the module installation parts 120A, the power source 110A, and the power-supply management device 1 are installed.

According to such a configuration, the power-supply management device 1 according to the present embodiment executes power-supply management processing based on the current state of the vehicle 100 and the types of the service modules SM currently installed in the vehicle 100, thereby achieving more appropriate power supply to the service modules SM.

Specifically, the power-supply management device 1 is provided with a memory unit 10 and a processing unit 20, as illustrated in FIG. 4.

The memory unit 10 is a storage circuit that stores therein various types of information. The memory unit 10 may be, for example, a storage device having a relatively large capacity, such as hard disk, solid state drive (SSD), optical disc, or a data rewritable semiconductor memory, such as RAM, flash memory, non volatile static random-access memory (NVSRAM). The memory unit 10 stores therein, for example, computer programs that enable the power-supply management device 1 to perform various functions. The computer programs stored in the memory unit 10 include a computer program that enables the processing unit 20 to function. The memory unit 10 stores therein various types of data necessary for various processes in the processing unit 20. These various types of data are read out from the memory unit 10 by the processing unit 20 and other units, as needed. The memory unit 10 of the present embodiment stores therein a management table 10A used in the power-supply management processing executed by the processing unit 20. This management table 10A will be described in detail later with reference to FIG. 5.

The processing unit 20 is a processing circuit that performs various processing functions in the power-supply management device 1. The processing unit 20 is implemented by, for example, a processor. The processor means, for example, circuits such as central processing unit (CPU), micro processing unit (MPU), application specific integrated circuit (ASIC), field programmable gate array (FPGA), and other circuits. The processing unit 20 executes, for example, the computer programs read out from the memory unit 10 to implement each processing function. For example, the processing unit 20 can execute processing of acquiring various types of information necessary to execute the power-supply management processing from various sensors, detectors, imaging devices installed in the individual parts of the vehicle 100, or the autonomous driving ECU 110E, the cabin or cargo connection identification ECU 110F, and other components.

In addition, the processing unit 20 of the present embodiment functionally and conceptually includes a vehicle state recognition unit 20A, a service module identification unit 20B, and a power-supply management processing unit 20C to implement the various processing functions described above. The processing unit 20 executes, for example, the computer programs read out from the memory unit 10 to implement each of these processing functions of the vehicle state recognition unit 20A, the service module identification unit 20B, and the power-supply management processing unit 20C.

The vehicle state recognition unit 20A is a part having a function that can executes a vehicle state recognition process of recognizing the state of the vehicle 100 (in other words, the current scene (situation)). The vehicle state recognition unit 20A can typically perform the vehicle state recognition process based on information acquired from various sensors, detectors, and imaging devices installed in the individual parts of the vehicle 100, or the autonomous driving ECU 110E, the cabin or cargo connection identification ECU 110F, and other components.

As an example, in the vehicle state recognition process, the vehicle state recognition unit 20A of the present embodiment can distinguish and recognize, as the state of the vehicle 100, at least a travel and movement state and a service provision state. In other words, there are at least two states of the vehicle 100 that are distinguished and recognized by the vehicle state recognition unit 20A: the travel and movement state and the service provision state.

The travel and movement state described herein is a state in which the vehicle 100 is moving. The travel and movement state is, in more detail, an outbound travel and movement state in which the vehicle 100 travels from a vehicle base location to a location where a service is provided, and a return travel and movement state in which the vehicle 100 travels from the location where a service is provided to the vehicle base location. On the other hand, the service provision state is a state in which a service is being provided by the service modules SM, typically with the vehicle 100 stopped.

Here, in the vehicle state recognition process, the vehicle state recognition unit 20A can distinguish and recognize the outbound travel and movement state and the return travel and movement state as the travel and movement state. In other words, in the vehicle state recognition process, the vehicle state recognition unit 20A of the present embodiment can distinguish and recognize the outbound travel and movement state, the return travel and movement state, and the service provision state.

The service module identification unit 20B is a part having a function capable of executing a module type identification process of identifying a type of each of the service modules SM currently installed in the vehicle 100. The service module identification unit 20B can typically perform the module type identification process based on information acquired from various sensors, detectors, and imaging devices installed in the individual parts of the vehicle 100. In the module type identification process, the service module identification unit 20B identifies a type of each of the service modules SM installed in each of the module installation parts 120A individually.

As an example, in the module type identification process, the service module identification unit 20B of the present embodiment can distinguish and recognize, as the types of the service modules SM, ATM, certificate and residence certificate issuing machine, ticket issuing machine, mailbox, parcel delivery box, food (refrigerated and frozen) vending machine, food (room temperature) vending machine, and drink vending machine. In other words, examples of the types of the service modules SM distinguished and recognized by the service module identification unit 20B include ATM, certificate and residence certificate issuing machine, ticket issuing machine, mailbox, parcel delivery box, food (refrigerated and frozen) vending machine, food (room temperature) vending machine, and drink vending machine.

The power-supply management processing unit 20C is a part having a function capable of executing the power-supply management processing of managing power supply to the service modules SM. The power-supply management processing unit 20C can execute, for each of the service modules SM, the power-supply management processing of managing power supply to the service module SM individually based on the state of the vehicle 100 recognized by the vehicle state recognition unit 20A and the type of the service module SM identified by the service module identification unit 20B. In other words, in the power-supply management processing, the power-supply management processing unit 20C distributes and supplies electric power from the power source 110A to each of the service modules SM according to the recognized state of the vehicle 100 and the identified type of each of the service modules SM.

Here, in the power-supply management processing, the power-supply management processing unit 20C can execute the power-supply management processing based on a distinction between the travel and movement state and the service provision state, which are recognized by at least the vehicle state recognition unit 20A as the state of the vehicle 100. As an example, in the power-supply management processing, the power-supply management processing unit 20C of the present embodiment executes the power-supply management processing based on a distinction between the outbound travel and movement state, the return travel and movement state, and the service provision state, which are recognized by the vehicle state recognition unit 20A.

More specifically, in the power-supply management processing, the power-supply management processing unit 20C can execute the power-supply management processing based on an operationally required electric power amount corresponding to the state of the vehicle 100 recognized by the vehicle state recognition unit 20A and the types of the service modules SM identified by the service module identification unit 20B.

Here, the operationally required electric power amount is the amount of electric power required for the operations of the service modules SM, and corresponds to the power consumption consumed by the service modules SM during its operation. The operationally required electric power amount of the service module SM is predetermined for each type of the service modules SM and for each state of the vehicle 100, and is stored in the memory unit 10. In the form of the management table 10A as illustrated in FIG. 5, the memory unit 10 of the present embodiment stores therein the operationally required electric power amount required for the operations of the service modules SM for each type of the service modules SM and for each state of the vehicle 100.

The operationally required electric power amounts of some service modules SM vary for each state of the vehicle 100 depending on their application, service content, and other reasons, while the operationally required electric power amounts of other service modules SM are constant regardless of the states of the vehicle 100. The management table 10A in FIG. 5 is made to specify this operationally required electric power amount for each type of the service modules SM and for each state of the vehicle 100.

The management table 10A illustrated in FIG. 5 specifies an operationally required electric power amount for each of the following types of the service modules SM: ATM, certificate and residence certificate issuing machine, ticket issuing machine, mailbox, parcel delivery box, food (refrigerated and frozen) vending machine, food (room temperature) vending machine, and drink vending machine. The management table 10A illustrated in FIG. 5 also specifies an operationally required electric power amount for each of the following states of the vehicle 100 in each of the above-mentioned types of the service modules SM: outbound travel and movement state, service provision state, and return travel and movement state.

For example, in the example in FIG. 5, the operationally required electric power amount of each of the ATM and the certificate and residence certificate issuing machine is specified as 150 W in the outbound travel and movement state and the return travel and movement state, while the operationally required electric power amount is specified as 300 W in the service provision state. The operationally required electric power amount of each of the ticket issuing machine and the food (room temperature) vending machine is specified as 0 in the outbound travel and movement state and the return travel and movement state, while the operationally required electric power amount is specified as 300 W in the service provision state. The mailbox does not need power supply, and has the operationally required electric power amount specified as 0 throughout all states of the outbound travel and movement state, the service provision state, and the return travel and movement state. The operationally required electric power amount of the parcel delivery box is specified as 0 in the outbound travel and movement state and the return travel and movement state, while the operationally required electric power amount is specified as 150 W in the service provision state. The operationally required electric power amount of the food (refrigerated and frozen) vending machine is specified as 1000 W throughout all states of the outbound travel and movement state, the service provision state, and the return travel and movement state. The operationally required electric power amount of the drink vending machine is specified as 800 W in the outbound travel and movement state and specified as 1000 W in the service provision state, while the operationally required electric power amount is specified as 0 in the return travel and movement state.

The power-supply management processing unit 20C of the present embodiment executes the power-supply management processing based on the management table 10A stored in the memory unit 10. In other words, the power-supply management processing unit 20C determines and ascertains, based on the management table 10A, the operationally required electric power amount corresponding to the state of the vehicle 100 recognized by the vehicle state recognition unit 20A and the types of the service modules SM identified by the service module identification unit 20B. The power-supply management processing unit 20C then supplies electric power according to the operationally required electric power amount from the power source 110A to each of the service modules SM individually, based on the operationally required electric power amount determined for each of the service modules SM.

Furthermore, in the power-supply management processing, the power-supply management processing unit 20C of the present embodiment can execute the power-supply management processing after securing a required return electric power amount that is the amount of electric power in the power source 110A, which is required for return from a current location of the vehicle 100 to a predetermined vehicle base location. The power-supply management processing unit 20C calculates a distance between the current location of the vehicle 100 and the predetermined vehicle base location based on information acquired from, for example, various sensors, detectors, and imaging devices installed in the individual parts of the vehicle 100, or the autonomous driving ECU 110E and other components, and calculates the required return electric power amount based on the calculated distance. This required return electric power amount includes, for example, the necessary minimum amount of electric power supplied to each of the service modules SM in the return travel and movement state. In the power-supply management processing, the power-supply management processing unit 20C can also perform power supply to the service modules SM to the extent that this required return electric power amount can be secured in the power source 110A.

In this case, in the power-supply management processing, the power-supply management processing unit 20C can execute the power-supply management processing while limiting power supply to the service modules SM based on the importance level corresponding to the types of the service modules SM identified by the service module identification unit 20B, the impact level of power-supply interruption, and the primary purpose set for the vehicle 100. The primary purpose set for the vehicle 100 corresponds to the primary use and service content set for the vehicle 100, and is optionally set for each of the vehicles 100 by an operator, for example.

Here, the importance level corresponding to the types of the service modules SM and the impact level due to power-supply interruption are predetermined for each type of the service modules SM and stored in the memory unit 10. The memory unit 10 of the present embodiment also uses the management table 10A illustrated in FIG. 5 to store the importance level of the service modules SM and the impact level due to power-supply interruption for each type of the service modules SM.

The importance level of the service modules SM and the impact level due to power-supply interruption on product value differ depending on its application, service content, and other reasons. The management Table 10A in FIG. 5 specifies these importance level and impact level on product value due to power-supply interruption (OFF) for each type of the service modules SM.

For example, in the example in FIG. 5, the ATM and the certificate and residence certificate issuing machine have the importance levels specified as "High". The ticket issuing machine, the mailbox, the parcel delivery box, the food (refrigerated and frozen) vending machine, the food (room temperature) vending machine, and the drink vending machine, other than the ATM and the certificate and residence certificate issuing machine, have the importance levels specified as "Low". Here, the importance level means that those specified as "High" are more important, while those specified as "Low" are less important than those specified as "High".

In the example in FIG. 5, the ATM and the certificate and residence certificate issuing machine have no impact level on product value due to power-supply interruption. The food (refrigerated/frozen) vending machine has the impact level on product value due to power-supply interruption specified as "High". The ticket issuing machine, the mailbox, the parcel delivery box, the food (room temperature) vending machine, and the drink vending machine, other than the food (refrigerated/frozen) vending machine, have the impact levels on product value due to power-supply interruption specified as "Low". Here, the impact level on product value due to power-supply interruption specified as "High" means that the damage to product value due to power-supply interruption is greater, while the impact level on product value due to power-supply interruption specified as "Low" means that the damage to product value due to power-supply interruption is smaller.

The management table 10A in FIG. 5 also specifies the priority to power-supply interruption (OFF) by associating the importance level corresponding to the types of the service modules SM, the impact level due to power-supply interruption, and the primary purpose set for the vehicle 100 with each other. In the example in FIG. 5, the primary purpose set for the vehicle 100 is set to "Parcel delivery box". The ticket issuing machine, parcel delivery box, food (room temperature) vending machine, and drink vending machine, which have the importance levels specified as "Low", have a priority to power-supply interruption specified as "1". The food (refrigerated and frozen) vending machine, which has the importance level specified as "Low" but has the impact level on product value due to power-supply interruption specified as "High", has a priority to power-supply interruption specified as "2". The ATM and the certificate and residence certificate issuing machine, which have the importance level specified as "High", have a priority to power-supply interruption specified as "3". The mailbox that does not need electric power has no specified priority to power-supply interruption. Here, the priority to power-supply interruption means that the power supply will be interrupted first with priority given as the number is smaller. Among the service modules SM having equal priority, a service module SM having the type set in the primary purpose, "parcel delivery box" herein, is specified to be power-interrupted later.

In a case in which the power-supply management processing unit 20C of the present embodiment executes the power-supply management processing to the extent that the required return electric power amount can be secured in the power source 110A, power supply to the service modules SM is limited based on the management table 10A stored in the memory unit 10. In other words, the power-supply management processing unit 20C determines and ascertains, based on the management table 10A, the priority to power-supply interruption according to the importance level corresponding to the types of the service modules SM identified by the service module identification unit 20B, the impact level due to power-supply interruption, and the primary purpose set for the vehicle 100. The power-supply management processing unit 20C then limits power supply to the service modules SM by interrupting electric power supplied to the service modules SM based on the determined priority to power-supply interruption, thereby securing, for example, the required return electric power amount or the like in the power source 110A.

Figure 6:
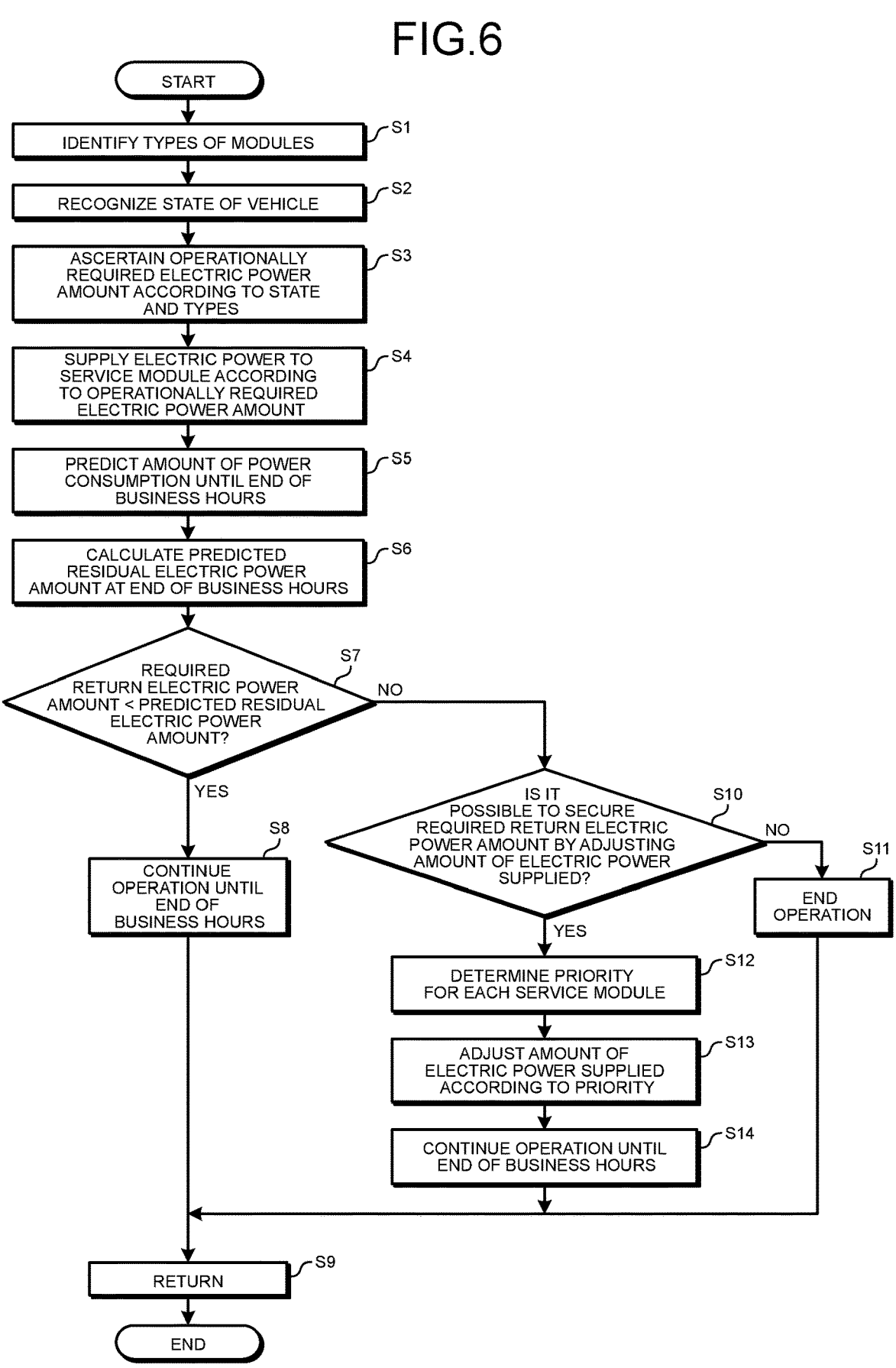
FIG. 6 is a flowchart illustrating an example of power-supply management processing performed by the power-supply management device according to the embodiment.

Next, an example of control in the power-supply management device 1 will be described with reference to a flowchart diagram in FIG. 6. Here, processes included in steps S3 to S14 correspond to contents of the power-supply management processing described above.

First, the service module identification unit 20B of the processing unit 20 executes the module type identification process of identifying the types of the service modules SM currently installed in the vehicle 100 (step S1). The service module identification unit 20B identifies the type of each of the service modules SM installed in each of the module installation parts 120A individually based on information acquired from various sensors, detectors, imaging devices, and other components installed in the individual parts of the vehicle 100. Here, the service module identification unit 20B distinguishes and recognizes, as the types of the service modules SM, ATM, certificate and residence certificate issuing machine, ticket issuing machine, mailbox, parcel delivery box, food (refrigerated and frozen) vending machine, food (room temperature) vending machine, and drink vending machine.

Next, the vehicle state recognition unit 20A of the processing unit 20 executes the vehicle state recognition process of recognizing the current state of the vehicle 100 (step S2). The vehicle state recognition unit 20A recognizes the current state (scene) of the vehicle 100 based on information acquired from various sensors, detectors, and imaging devices installed in the individual parts of the vehicle 100, or the autonomous driving ECU 110E, the cabin or cargo connection identification ECU 110F, and other components. Here, the vehicle state recognition unit 20A distinguishes and recognizes the outbound travel and movement state, the return travel and movement state, and the service provision state as the current state of the vehicle 100.

Next, the power-supply management processing unit 20C of the processing unit 20 determines and ascertains an operationally required electric power amount according to the current state of the vehicle 100 recognized by the vehicle state recognition unit 20A and the types of the service modules SM identified by the service module identification unit 20B (step S3). The power-supply management processing unit 20C determines and ascertains, based on the management table 10A stored in the memory unit the operationally required electric power amount corresponding to the types of the service modules SM identified at step S1 and the state of the vehicle 100 recognized at step S2. The power-supply management processing unit 20C determines and ascertains the operationally required electric power amount for each of the service modules SM installed in each of the module installation parts 120A individually.

Next, the power-supply management processing unit 20C supplies electric power from the power source 110A to each of the service modules SM according to the operationally required electric power amount determined and ascertained for each of the service modules SM at step S3 (step S4).

Next, the power-supply management processing unit 20C predicts the amount of power consumption from the current time to an optional predetermined end of business hours (step S5). The power-supply management processing unit 20C predicts the amount of power consumption until the end of business hours based on the operationally required electric power amount corresponding to each of the service modules SM ascertained at step S3 and the period from the current time to the end of business hours.

Next, the power-supply management processing unit 20C calculates a predicted residual electric power amount at the end of business hours (step S6). The power-supply management processing unit 20C calculates, based on information acquired from various sensors and detectors installed in the individual parts of the vehicle 100, the predicted residual electric power amount (predicted battery residual amount) at the end of business hours by subtracting the amount of power consumption until the end of business hours predicted at step S5 from the current residual electric power amount (battery residual amount) in the power source 110A.

Next, the power-supply management processing unit 20C calculates the required return electric power amount required for the return from the current location of the vehicle 100 to the vehicle base location based on information acquired from various sensors, detectors, and imaging devices installed in the individual parts of the vehicle 100, or the autonomous driving ECU 110E and other components, and also determines whether or not the predicted residual electric power amount at the end of business hours calculated at step S6 is greater than the required return electric power amount (step S7).

In a case in which it has been determined that the predicted residual electric power amount at the end of business hours is greater than the required return electric power amount (Yes at step S7), the power-supply management processing unit 20C continues operation until the end of business hours while executing the power-supply management processing (step S8).

The autonomous driving ECU 110E then allows the vehicle 100 to autonomously drive back to the vehicle base location at the end of business hours (step S9), and terminates this control. During this procedure, the power-supply management processing unit 20C is executing the power-supply management processing corresponding to the return travel and movement state.

In a case in which it has been determined at step S7 that the predicted residual electric power amount at the end of business hours is equal to or less than the required return electric power amount (No at step S7), the power-supply management processing unit 20C adjusts the amount of electric power supplied to the service modules SM to determine whether or not the required return electric power amount, as the residual electric power of the power source 110A at the end of business hours, can be secured (step S10).

In a case in which it is not possible to secure the required return electric power amount even though the power-supply management processing unit 20C adjusts the amount of electric power supplied to the service modules SM, that is, the required return electric power amount cannot be secured even though the power-supply management processing unit 20C adjusts the amount of electric power supplied to the service modules SM, or the power-supply management processing unit 20C cannot adjust the amount of electric power supplied to any of the service modules SM (No at step S10), the power-supply management processing unit 20C immediately ends the operation (step S11), and the processing proceeds to step S9. Here, the case in which the power-supply management processing unit 20C cannot adjust the amount of electric power supplied to any of the service modules SM is, for example, a case in which the importance level of all service modules SM is so high that electric power interruption is not acceptable for any of the service modules SM.

In a case in which it has been determined at step S10 that the required return electric power amount can be secured by the adjustment of the amount of electric power supplied to the service modules SM (Yes at step S10), the power-supply management processing unit 20C determines the priority to electric power interruption for each of the service modules SM (step S12). The power-supply management processing unit 20C determines and ascertains, based on the management table 10A stored in the memory unit 10, the priority to power-supply interruption according to the importance level corresponding to the types of the service modules SM identified by the service module identification unit 20B and the impact level due to power-supply interruption, the primary purpose set for the vehicle 100, and the like.

Next, the power-supply management processing unit 20C performs power-supply interruption on the service modules SM sequentially according to the priority to electric power interruption for each of the service modules SM determined at step S12 to adjust the amount of supplied power (step S13). The power-supply management processing unit 20C performs power-supply interruption on the service modules SM sequentially until the required return electric power amount, as the residual electric power amount of the power source 110A at the end of business hours, can be secured according to the priority to electric power interruption.

The power-supply management processing unit 20C then continues operation until the end of business hours (step S14) while executing the power-supply management processing with power supply to the service modules limited to secure the required return electric power amount, and the processing proceeds to step S9.

The power-supply management device 1 and the vehicle 100 can execute, by the power-supply management processing unit 20C, the power-supply management processing for each of the service modules SM individually based on the state of the vehicle 100 recognized by the vehicle state recognition unit 20A and the types of the service modules SM identified by the service module identification unit 20B. This processing enables the power-supply management device 1 and the vehicle 100 to individually optimize power supply and power distribution to each of the service modules SM according to the current state of the vehicle 100 and the types of the service modules SM currently installed in the vehicle 100.

For example, the power-supply management device 1 can reduce the unnecessary supply of electric power to a service module SM that consumes relatively little electric power, unlike a case in which electric power is uniformly supplied to all service modules SM in accordance with a service module SM that can be installed in this vehicle 100 and consumes the largest amount of electric power. In addition, the power-supply management device 1 can, for example, reduce the unnecessary supply of electric power to the service modules SM when power supply is unnecessary according to the state of the vehicle 100, unlike a case in which electric power is uniformly supplied to the service modules SM at all times, regardless of the state of the vehicle 100.

As a result, the power-supply management device 1 and the vehicle 100 can properly supply electric power to the service modules SM, and for example, can achieve reducing wasteful power consumption and saving electric power, as well as contributing to extending the lifetime of the electrical storage device.

The power-supply management device 1 and the vehicle 100 configured as described above are useful, for example, from the perspectives of the recent SDGs. In other words, the power-supply management device 1 and the vehicle 100 can properly supply electric power to the service modules and save electric power as described above, thereby contributing to achieving goals such as "Affordable and Clean Energy", "Industry, Innovation and Infrastructure", "Sustainable Cities and Communities", and "Climate Action" listed as the SDGs.

More specifically, in the power-supply management processing, the power-supply management device 1 and the vehicle 100 described above can supply electric power to the service modules SM based on the operationally required electric power amount corresponding to the state of the vehicle 100 and the types of the service modules SM by the power-supply management processing unit 20C. This processing enables the power-supply management device 1 and the vehicle 100 to reduce the unnecessary electric power exceeding the operationally required electric power amount, which is determined according to the state of the vehicle 100 and the types of the service modules SM, to be supplied to the service modules SM as described above. As a result, the power-supply management device 1 and the vehicle 100 can properly supply electric power to the service modules SM as described above.

Here, in the power-supply management processing, the power-supply management device 1 and the vehicle 100 described above can distinguish the travel and movement state from the service provision state as the state of the vehicle 100 and supply electric power to the service modules SM by the power-supply management processing unit 20C. This processing enables the power-supply management device 1 and the vehicle 100 to supply electric power to the service modules SM as described above in accordance with both the travel and movement state and the service provision state without wasting electric power. As a result, the power-supply management device 1 and the vehicle 100 can properly supply electric power to the service modules SM as described above.

In addition, in the power-supply management processing, the power-supply management device 1 and the vehicle 100 described above can supply electric power to the service modules SM after the power-supply management processing unit 20C secures the required return electric power amount in the power source 110A, which is required for return from the current location of the vehicle 100 to the predetermined vehicle base location. This processing enables the power-supply management device 1 and the vehicle 100 to safely and reliably return the vehicle 100 to the vehicle base location with the required return electric power amount that has been secured by the power-supply management processing, after properly supplying electric power to the service modules SM as described above.

Here, in the power-supply management processing, the power-supply management device 1 and the vehicle 100 described above can limit, by the power-supply management processing unit 20C, power supply to the service modules SM based on the priority according to the importance level corresponding to the types of the service modules SM, the impact level due to power-supply interruption, the primary purpose set for the vehicle, and the like. This processing enables the power-supply management device 1 and the vehicle 100 to shift to an energy-saving mode with power consumption reduced as needed, and to secure the required return electric power amount for the vehicle 100 to return to the vehicle base location as needed as described above, for example.

The power-supply management device for service modules and the service module installed vehicle according to the above-mentioned embodiment of the present invention are not limited to the above-mentioned embodiment, and various modifications are possible within the scope of claims.

In the above description, the vehicle 100 is a Maas-only vehicle and described as a fully autonomous electric vehicle that autonomously travels between the vehicle base location and the location where a service is provided, but the present invention is not limited thereto. For example, the vehicle 100 may be a manually driving vehicle the behavior of which is controlled according to the driver's operation.

In the above description, the vehicle 100 includes the chassis 110 and the cargo 120, and is provided with the power source 110A arranged on the chassis 110 side, and the module installation parts 120A and the power-supply management device 1 arranged on the cargo 120 side, but the present invention is not limited thereto. The vehicle 100 may be configured without the distinction between the chassis 110 and the cargo 120, and positions where the power source 110A, the module installation parts 120A, and the power-supply management device 1 are installed are not limited to the above description.

In the above description, the power-supply management processing unit 20C is described as executing the power-supply management processing based on the operationally required electric power amount corresponding to the recognized state of the vehicle 100 and the identified types of the service modules SM, but the present invention is not limited thereto.

In the above description, the power-supply management processing unit 20C is described as distinguishing at least the travel and movement state from the service provision state as the state of the vehicle 100, and more specifically, distinguishing the outbound travel and movement state, the return travel and movement state, and the service provision state from each other and executing the power-supply management processing, but the present invention is not limited thereto. The power-supply management processing unit 20C can also distinguish different states from the above examples as the state of the vehicle 100 and execute the power-supply management processing. The power-supply management processing unit 20C can also change the content of the power-supply management processing according to the distinguished state of the vehicle 100, as appropriate.

In the above description, the power-supply management processing unit 20C is described as distinguishing ATM, certificate and residence certificate issuing machine, ticket issuing machine, mailbox, parcel delivery box, food (refrigerated and frozen) vending machine, food (room temperature) vending machine, and drink vending machine from each other, as the types of the service modules SM, and executing the power-supply management processing, but the present invention is not limited thereto. The power-supply management processing unit 20C can also distinguish a different type of the service modules SM from the above-mentioned examples, as the types of the service modules SM, and execute the power-supply management processing. The power-supply management processing unit 20C can also change the content of the power-supply management processing according to a type of the distinguished service module SM, as appropriate.

In the above description, the memory unit 10 is described as storing the operationally required electric power amount for each type of the service modules SM and for each state of the vehicle 100 in the form of the management table 10A as illustrated in FIG. 5, but the present invention is not limited thereto, and the memory unit 10 may store therein the operationally required electric power amount in another form. In the above description, the memory unit 10 is described as storing, for each type of the service modules SM, the importance level of the service modules SM, the impact level due to power-supply interruption, the priority to electric power interruption, and the like with the management table 10A as illustrated in FIG. 5, but the present invention is not limited thereto, and the memory unit 10 may store therein those with another table, and may store therein those in another form.

In the above description, the power-supply management processing unit 20C is described as executing the power-supply management processing after securing the required return electric power amount in the power source 110A, but the present invention is not limited thereto.

In the description of the processing unit 20 above, each processing function is implemented by a single processor, but the present invention is not limited thereto. The processing unit 20 may implement each processing function by combining a plurality of independent processors and causing each processor to execute a computer program. The processing functions that the processing unit has may be implemented with distributed or integrated into a single or multiple processing circuits as appropriate. The processing functions that the processing unit 20 has may be implemented in all or in some by computer programs, or may be implemented as hardware using wired logic or other means.

The power-supply management device for service modules and the service module installed vehicle according to the present embodiment may be configured by a combination of the components of the embodiment and modification examples described above, as appropriate.

The power-supply management device for service modules and the service module installed vehicle according to the present embodiment are able to properly supply electric power to the service modules.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power-supply management device for a vehicle including a power supply and a plurality of service modules interchangeably installed in the vehicle, the power-supply management device comprising:

a vehicle state recognition unit that recognizes a current state of the vehicle from a plurality of different states;

a service module identification unit that identifies a type for each of the service modules currently installed in the vehicle; and a power-supply management processing unit that is capable of executing, for each of the service modules, power-supply management processing of managing power supply to each of the service modules individually based on the state of the vehicle recognized by the vehicle state recognition unit and the type of the service module identified by the service module identification unit, wherein the vehicle is capable of recombining with various combinations of the installed plurality of the service modules, the service module identification unit identifies a type of each of the plurality of the service modules installed in the vehicle individually, the plurality of different states includes a first state and a second state, in the power-supply management processing, the power-supply management processing unit distributes and supplies electric power from a power source to each of the plurality of the service modules, and in the power-supply management processing, the power-supply management processing unit supplies one of the service modules with a first power when the current state of the vehicle is the first state, and supplies the one of the service modules with a second power when the current state of the vehicle is the second state, the first power is different from the second power.

2. The power-supply management device for service modules according to claim 1, further comprising:

a memory unit that stores therein an operationally required electric power amount, which is an amount of electric power required for an operation of the service module, for each type of the service module and for each state of the vehicle, wherein in the power-supply management processing, the power-supply management processing unit is capable of executing the power-supply management processing based on the operationally required electric power amount corresponding to the state of the vehicle recognized by the vehicle state recognition unit and the type of the service module identified by the service module identification unit.

3. The power-supply management device for service modules according to claim 1, wherein the first state is a travel and movement state in which the vehicle is traveling, and the second state is a service provision state in which the service module is providing a service, the vehicle state recognition unit is capable of distinguishing the first state from the second state and recognizing one of the first state and the second state as the current state of the vehicle, and in the power-supply management processing, the power-supply management processing unit is capable of executing the power-supply management processing based on a distinction between the travel and movement state and the service provision state recognized by the vehicle state recognition unit.

4. The power-supply management device for service modules according to claim 2, wherein the first state is a travel and movement state in which the vehicle is traveling, and the second state is a service provision state in which the service module is providing a service, as the state of the vehicle, and the vehicle state recognition unit is capable of distinguishing the first state from the second state and recognizing one of the first state and the second state as the current state of the vehicle, and in the power-supply management processing, the power-supply management processing unit is capable of executing the power-supply management processing based on a distinction between the travel and movement state and the service provision state recognized by the vehicle state recognition unit.

5. The power-supply management device for service modules according to claim 1, wherein in the vehicle, the power source that is capable of supplying electric power to the service module is also used for travel of the vehicle, and in the power-supply management processing, the power-supply management processing unit is capable of executing the power-supply management processing after securing a required return electric power amount that is an amount of electric power in the power source required for return from a current location of the vehicle to a predetermined vehicle base location.

6. The power-supply management device for service modules according to claim 2, wherein in the vehicle, the power source that is capable of supplying electric power to the service module is also used for travel of the vehicle, and in the power-supply management processing, the power-supply management processing unit is capable of executing the power-supply management processing after securing a required return electric power amount that is an amount of electric power in the power source required for return from a current location of the vehicle to a predetermined vehicle base location.

7. The power-supply management device for service modules according to claim 3, wherein in the vehicle, the power source that is capable of supplying electric power to the service module is also used for travel of the vehicle, and in the power-supply management processing, the power-supply management processing unit is capable of executing the power-supply management processing after securing a required return electric power amount that is an amount of electric power in the power source required for return from a current location of the vehicle to a predetermined vehicle base location.

8. The power-supply management device for service modules according to claim 4, wherein in the vehicle, the power source that is capable of supplying electric power to the service module is also used for travel of the vehicle, and in the power-supply management processing, the power-supply management processing unit is capable of executing the power-supply management processing after securing a required return electric power amount that is an amount of electric power in the power source required for return from a current location of the vehicle to a predetermined vehicle base location.

9. The power-supply management device for service modules according to claim 1, further comprising:

a memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

10. The power-supply management device for service modules according to claim 2, further comprising:

the memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

11. The power-supply management device for service modules according to claim 3, further comprising:

a memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

12. The power-supply management device for service modules according to claim 4, further comprising:

the memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

13. The power-supply management device for service modules according to claim 5, further comprising:

a memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

14. The power-supply management device for service modules according to claim 6, further comprising:

the memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

15. The power-supply management device for service modules according to claim 7, further comprising:

a memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

16. The power-supply management device for service modules according to claim 8, further comprising:

the memory unit that stores therein an importance level of the service module and an impact level due to power-supply interruption for each type of the service module, wherein in the power-supply management processing, the power-supply management processing unit is capable of executing the power-supply management processing while limiting power supply to the service module based on the importance level corresponding to the type of the service module identified by the service module identification unit, the impact level due to power-supply interruption, and a primary purpose set for the vehicle.

17. A vehicle, comprising:

a plurality of module installation parts in which service modules are interchangeably installed;

a power source that is capable of supplying electric power to the service modules; and a power-supply management device for service modules that manages power supply from the power source to the service modules, wherein the power-supply management device for service modules includes a vehicle state recognition unit that recognizes a current state of the vehicle from a plurality of different states a service module identification unit that identifies types of the service modules currently installed in the vehicle, and a power-supply management processing unit that is capable of executing, for each of the service modules, power-supply management processing of managing power supply to each of the service modules individually based on the state of the vehicle recognized by the vehicle state recognition unit and the type of the service module identified by the service module identification unit, wherein the vehicle is capable of recombining with various combinations of the plurality of the service modules installed in the plurality of the module installation parts, the service module identification unit identifies a type of each of the plurality of the service modules installed in the plurality of the module installation parts individually, and the plurality of different states includes a first state and a second state, in the power-supply management processing, the power-supply management processing unit distributes and supplies electric power from the power source to each of the plurality of the service modules, and in the power-supply management processing, the power-supply management processing unit supplies one of the service modules with a first power when the current state of the vehicle is the first state, and supplies the one of the service modules with a second power when the current state of the vehicle is the second state, the first power is different from the second power.

* * * * *